United States Patent Office 3,110,693
Patented Nov. 12, 1963

---

3,110,693
MANUFACTURE OF TEREPHTHALATE POLYESTERS USING A MANGANESE GLYCOLOXIDE CATALYST
George Reid Ure, Harrogate, England, assignor to Imperial Chemical Industries Limited, London, England, a corporation of Great Britain
No Drawing. Filed Sept. 21, 1960, Ser. No. 57,411
Claims priority, application Great Britain Oct. 6, 1959
5 Claims. (Cl. 260—40)

This invention relates to the manufacture of polyesters, in particular to an improved catalyst for use therein.

According to the present invention I provide an improved process for the manufcture of polyesters from terephthalic acid or an alkyl ester thereof and a glycol having the formula $HO(CH_2)_nOH$ where $n$ is 2 to 10 inclusive characterised in that a manganese glycoloxide is present as catalyst.

The use of manganese glycoloxides as catalysts in the preparation of polyesters has the following advantages:

(a) The introduction into the polyester of any impurity other than manganese metal is avoided, (b) There is no cation associated with the metal which is subsequently found in the recovered glycol and complicates the process of purification.

(c) The absence of electrolytes leads to greater stability in dispersions of pigments, such as carbon black, commonly added to polyesters.

(d) Polyesters made using manganese glycoloxides yield shaped articles having improved electrical properties.

It is, of course, logical that the glycoloxide of manganese is prepared from the same glycol or mixtures of glycols as will be used in the polyester preparation but this is not essential.

I have found that the use of manganese ethylene glycol oxide alone as catalyst in ester-interchange between dimethyl terephthalate and ethylene glycol and in the subsequent polycondensation of ethylene glycol terephthalate esters gives good rates of reaction and a polyester of high quality. If desired, other polycondensation catalysts such as compounds of antimony in either tri- or pentavalent form, may be used in conjunction with manganese glycoloxide.

The examples which follow and in which all parts and percentages are by weight illustrate but do not limit my invention.

EXAMPLE 1

*The Preparation of Manganese Ethylene Glycoloxide*

100 parts of manganous acetate tetrahydrate are refluxed in 1,000 parts of ethylene glycol for 30 minutes or until solution is complete. 100 parts of ethylene glycol are distilled from the solution, removing all the water and some acetic acid and glycol acetates. The resulting slurry of manganese glycoloxide may be used directly as ester-interchange catalyst. If desired the glycoloxide may be collected by filtration, washing with ethylene glycol, and dried at 100° C. in a vacuum. It may be stored for some months in a closed vessel without loss of catalytic activity. The product contains by analysis 43–46% of total manganese and less than 1% of ionic manganese. The glycoloxide structure is confirmed by comparison of the infra red spectrum with that of known glycoloxides.

The salts of manganese with other weak acids may be substituted for manganous acetate in the corresponding molar proportions.

Examples 2, 3, 5, and 6 illustrate the preparations of polyesters using manganese glycoloxides as catalyst. In Examples 4 and 7 calicium acetate, one of the best known catalysts in polyester manufacture, is used for the purpose of comparision.

EXAMPLE 2

100 parts of dimethyl terephthalate and 72 parts of ethylene glycol are melted together and heated to 155° C. 0.03 part of manganese glycoloxide in 0.3 part of ethylene glycol is added and melt heated gradually. Methanol distils continuously for 3.5 hours by which time the theoretical volume is collected and the temperature of the batch is 205° C. The melt is heated to 225° C. while ethylene glycol distils. 0.04 part of antimony trioxide is added and vacuum applied to the vessel containing the melt. After 1.5 hours at a pressure below 1 mm. and a temperature of 280° C. the polymer, having intrinsic viscosity (measured at 1% concentration in othochlorophenol)=0.60, is extruded.

EXAMPLE 3

The same reactants are used as in Example 2 except that the antimony trioxide is omitted. The polymerisation time from 1 mm. pressure is 3.25 hours.

EXAMPLE 4

With the same reactants as in Example 2, calcium acetate, 0.07 part is used in place of the manganese glycoloxide. The corresponding polymerisation time to intrinsic viscosity 0.60 is 2.5 hours.

The distillate from the polycondensation reaction of Example 4 contained ethylene glycol acetate but the corresponding distillates 2 and 3 were substantially pure ethylene glycol.

Comparison of the properties of polymers 2, 3 and 4 showed that the clarity, as indicated by the optical density of solutions in othochlorophenol, of polymer 3 was slightly better than that of polymer 2 and very much better than that of polymer 4.

Similarly the electrical resistivity of polymer 3 is many times greater than that of polymer 4 and marginally superior to that of polymer 2.

EXAMPLES 5–7

Examples 5, 6 and 7 are respectively repeats of numbers 2, 3 and 4 wherein the ethylene glycol is first homogenised with 3 parts of finely divided carbon black.

Photomicrographs of thin sections of the resulting polymers taken at 200× magnification show that the degree of dispersion of the pigment is unaffected in the presence of manganese glycoloxide alone, and only slightly affected by the additional presence of antimony trioxide. By comparison the dispersion of carbon in the polymer made using calcium acetate is considerably coarser than in the added ethylene glycol slurry.

What I claim is:

1. An improved process for the manufacture of a polymeric polyester which comprises reacting a dialkyl ester of terephthalic acid with a glycol having the formula

where $n$ is an integer from 2 to 10 inclusive in the presence of a catalyst consisting essentially of manganese ethylene glycoloxide and then polycondensing the resulting product.

2. A process according to claim 1 wherein the polyester is polyethylene terephthalate.

3. A process according to claim 2 wherein there is also present, during the polycondensation, as a polycondensation catalyst, a compound of antimony.

4. A process according to claim 3 wherein an insoluble pigment is also present during the polyester forming reaction.

5. A process according to claim 4 wherein the insoluble pigment is carbon black.

References Cited in the file of this patent

UNITED STATES PATENTS 2,951,060    Billica ---------------- Aug. 30, 1960

FOREIGN PATENTS 610,137    Great Britain ---------- Oct. 12, 1948
760,125    Great Britain ---------- Oct. 31, 1956
805,534    Great Britain ---------- Dec. 10, 1958